Ali Javan
Ronald H. Cordover
Paul A. Bonczyk
INVENTOR.

United States Patent Office 3,547,524
Patented Dec. 15, 1970

3,547,524
MEASUREMENTS OF ISOTOPE SHIFTS
Ali Javan, Boston, Mass., Ronald H. Cordover, Fort Lee,
N.J., and Paul A. Bonczyk, Newton, Mass., assignors,
by mesne assignments, to the United States of America
as represented by the Secretary of the Navy
Filed Apr. 8, 1968, Ser. No. 719,630
Int. Cl. G01b 9/02; H01s 3/00
U.S. Cl. 356—106                                1 Claim

ABSTRACT OF THE DISCLOSURE

Apparatus is provided for resolving overlapping spectral lines of two isotopes. Resolution of these lines is obtained by interacting two sets of atoms of one isotope and a third set of a second isotope with a laser tuned to a transition of one of the isotopes such that the line widths of the spectra corresponding to spontaneous emissions from the lower laser levels of both isotopes are effectively narrowed. These lines are narrowed because the laser field selects for the spectral pattern only atoms of one isotope moving transverse to the longitudinal axis of the laser and only atoms of the other isotope moving at some fixed angle with respect to this axis. By selecting only these atoms, the usual Doppler-broadening due to atoms traveling in all directions is effectively prevented.

The invention described herein may be manufactured and used by or for the Government of the United States of America for governmental purposes without the payment of any royalties thereon or therefor.

This invention relates to spectrographic analysis techniques and, more specifically, to a method for obtaining increased spectral resolution by subjecting atoms in an excited state to stationary and traveling waves produced by lasers. When these excited atoms are subjected to stationary waves at the laser center frequency, only atoms having velocities transverse to the longitudinal axis of the laser contribute to the spectral pattern. When the laser is detuned, only atoms having velocities at some fixed angle with respect to the longitudinal axis contribute to the spectral pattern. The selection of atoms having particular velocities effectively prevents Doppler-broadening of the spectral lines due to atoms traveling in all directions and makes possible resolution of adjacent spectra heretofore lost in the Doppler-broadened spectral profile.

The device developed is suitable for the measurement of isotope shifts of electronic spectra of light atoms. In these atoms the magnitude of the Doppler effect is such that these shifts are often unresolved in normal emission spectroscopy. The device described allows one to determine these shifts by effective preferential viewing of emission from atoms of fixed velocity. If the laser is tuned to a transition of one of these isotopes, it will automatically be detuned with respect to the same transition in the other of the isotopes. The spectra from the sets of atoms coupled to the tuned and untuned waves will be narrowed according to the above velocity selection process. Thus, when two or more elements are present whose spontaneous emissions produce overlapping spectral lines, subjecting atoms of both elements to stationary and traveling waves of a laser causes the spectral lines of the two elements to be narrowed simultaneously. From these narrowed spectral lines, location and line widths can be measured directly.

Applications of this technique include resolution of isotope shifts, resolution of fine and hyperfine atomic structure, determination of natural line width, and cross sections of atomic collisions. Stabilization of laser frequency may be achieved by placing this spectrum analyzer in the frequency control loop of the laser.

It is therefore the object of this invention to provide means for improving spectral resolution by interacting atoms of two or more elements with the stationary and traveling waves produced by a laser such that spectral lines produced by the spontaneous radiation from these atoms will be narrowed by effectively removing unwanted Doppler-shifted components from the spectral pattern.

It is a further object of this invention to provide means for improivng spectral resolution by interacting atoms of two or more isotopes with stationary and traveling waves produced by a laser so as to select for the spectral pattern atoms of one isotope having a velocity transverse to the longitudinal axis of the laser while simultaneously selecting atoms of another isotope moving at some fixed angle with respect to this longitudinal axis.

Other objects, advantages and novel features of the invention will become apparent from the following detailed description thereof when considered in conjunction with the accompanying drawings in which like numerals represent like parts throughout and wherein.

Figure 1:
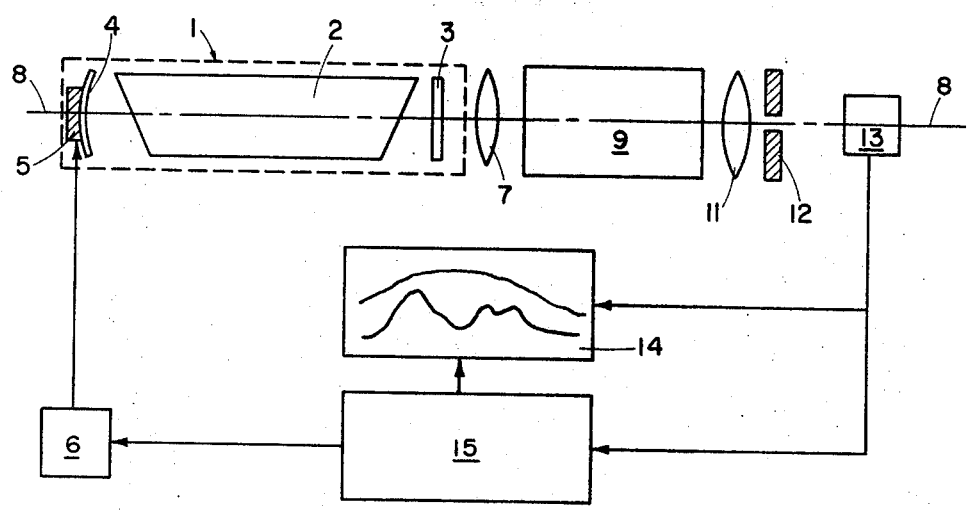
FIG. 1 is a schematic diagram of the spectrum analyzer including the laser illuminating source and detection apparatus.

Referring to FIG. 1, a gas laser, represented by dotted rectangle 1, is shown having a storage tube 2. In one experimental configuration, this tube was filled with a 9.5:1 He-Ne mixture at a total gas pressure of 2.1 torr. This mixture was composed of 1.9 torr, $He^3$, 0.08 torr $Ne^{20}$ and 0.12 torr $Ne^{22}$. The 3:2 ratio of $Ne^{22}$ to $Ne^{20}$ facilitated analysis of the observed emission shown in the lower trace on strip chart recorder 14. The upper trace indicates the spontaneous emission of the gases in tube 2 prior to interacting the atoms with the laser field. The difference in these two traces indicates the enhanced resolution when the laser is turned on.

The cavity for this laser is defined by a flat mirror 3 and a curved mirror 4. Mirror 3 is coated so as to be highly reflective at the laser wavelength, $1.15\mu$, and transparent at the spontaneous emission transition 6096° A. Curved mirror 4 is mounted on a lead zirconate piezoelectric crystal 5 so that it may be modulated to vary the length of the cavity. The cavity is tunable over approximately two wavelengths at the lasing frequency, $1.15\mu$, allowing tuning over four consecutive axial modes with a high degree of parallelism. For phase detection purposes, to be described hereinafter, the mirror is modulated at 100 c.p.s. with a unidirectional square wave voltage from square wave generator 6. The magnitude of this voltage is adjusted so that the laser oscillates in an on-off mode. When the laser is off, the mirror separation is such that no cavity modes appear in the region of frequency where the gain is greater than the loss. When the laser is on, the DC bias coupled with the square amplitude permits further continuous adjustment of the length of the cavity.

A spark discharge (not shown) is used to initially ionize the gas in the laser. This energy is transferred to helium via electron collision which, in turn, transfers this energy to the neon by a cross-relaxation process. The neon then goes through a series of transitions, including a spontaneous emission at approximately 6096° A. This emission originates from the lower laser level. When the laser is on, the spontaneous emission of the neon along the axis of the tube is passed through mirror 3 and is collimated by a long focal length lens 7. The long focal length allows the collection of the maximum amount of light while maintaining the spontaneous emission parallel to the axis 8 of the optical system. This collimated light then enters a Fabry-Perot interferometer 9 which is composed of two plane parallel mirrors with $\lambda/200$ flatness and a reflectivity of 98.5% at the frequency of the spontaneous emission. Interferometer 9 forms a ring-type interference pattern. The central maximum of this pattern is focused through lens 11 and pinhole 12. This light is detected by an S–20 photomultiplier 13 which is designed to have a low anode, dark current on the order of $1 \times 10^{-7}$ amperes and a high gain on the order of $10^7$. The output of photomultiplier 13 is coupled to the input of a two-channel strip recorder 14 and to a phase-sensitive detector 15. With the modulation technique described, the output of phase-sensitive detector 15 corresponds to the line shape of the spontaneous emission of atoms which have interacted with the laser field. The spectral pattern is scanned by slowly leaking air into an evacuated chamber 9 housing the interferometer while allowing the chart recorder to free-run at some fixed speed.

Figure 2:
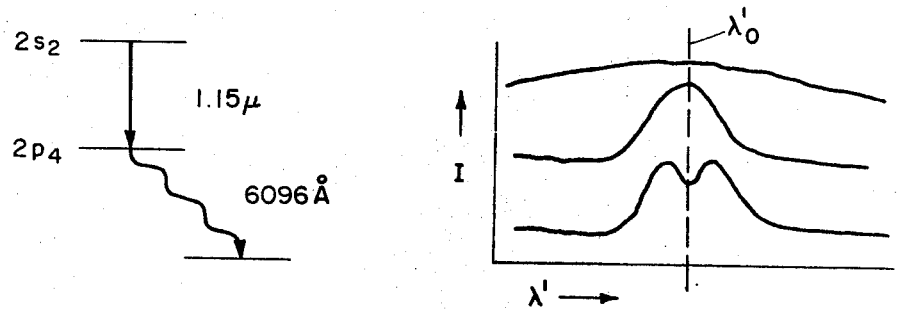
FIG. 2 is a diagrammatic and graphic representation of the velocity selection technique applied to the single element case.

One plausible explanation of this increased resolution is described in FIG. 2. In this drawing, the result of the interaction between atoms of one element with a tuned and detuned laser field is diagrammatically shown. Consider, as an example, the $2s_2$–$2p_4$ transition in neon, which has an approximate wavelength $\gamma_0 = 1.15\mu$. If there are enough atoms in the excited $2p_4$ state, there will be spontaneous transitions, one of which yielding an emission having a wavelength of approximately 6096° A. If atoms at the $2s_2$ level are subjected to a stationary lasing field at some fixed frequency, only certain atoms will contribute to the resonant increase in radiation at 6096° A. viewed along the longitudinal axis of the laser. If the laser is precisely tuned, a stationary wave will be set up between the ends of the cavity. Atoms moving transverse to the longitudinal axis of the laser contribute to the resonant increase in radiation. These atoms ($2s_2$) give up energy via the concurrent emission of two light quanta. The radiation at 6096° A. from these atoms appears as shown in the center trace of the graph in FIG. 2. The intense central portion of this is centered at $\gamma_0$, the center of the Doppler broadened curve which results from spontaneous emission. This Doppler broadened curve is shown as the top trace in the graph of FIG. 2. It can be seen that there is no contribution to the spectral pattern from atoms traveling in other directions since the Doppler broadened pattern does not appear. The sharp peak is due only to atoms traveling in the transverse direction.

If the laser is tuned away from its center frequency, atoms moving at some fixed angle with respect to the longitudinal axis of the laser contribute to the resonant increase in radiation by again giving up energy in the form of the concurrent emission of two light quanta. This radiation is shown as the "double peak" pattern in the lower face of FIG. 2.

This double peak is formed as follows:
The condition for resonance in the laser cavity is:

(1) $$W\left(1 - \frac{|v|}{c}\right) = W_0$$

where $W_0$ = natural frequency of atom,
$W$ = frequency of the traveling wave,
$|v|$ = absolute value of the velocity of the atoms producing the emission, and
$c$ = speed of light.

Defining Z as the direction of the longitudinal axis of the laser when $V_z = 0$, $v$ may take on values of either $+v$ or $-v$. The traveling waves couple to both the $+v$ atoms or the $-v$ atoms yielding the appropriaate Doppler-shifted radiations. This radiation appears as the two symmetrically shifted peaks mentioned above. Although the over-all width of this "two-peak" pattern is large, each of the two symmetrically shifted lines has a narrowed line width.

The intensity of the spontaneous emission radiation from off-resonance atoms along the longitudinal axis will be less significant with respect to radiation from on-resonance atoms moving in the directions so as to satisfy the resonance condition.

Figure 3:
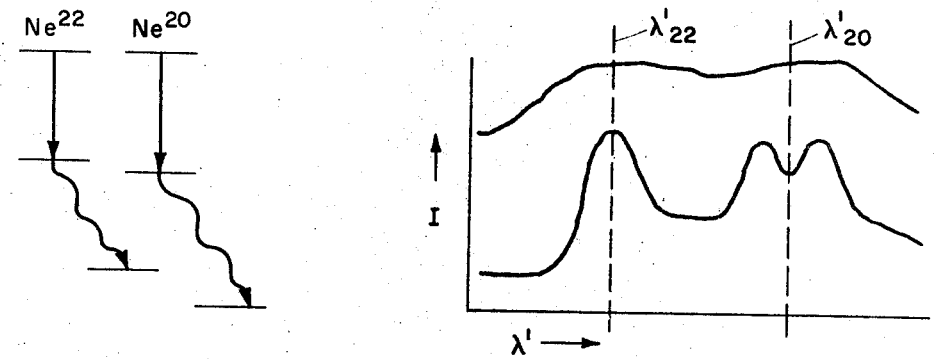
FIG. 3 is a diagrammatic and graphic representation of the velocity selection technique applied to the multiple isotope case.

In the two-isotope case shown diagrammatically in FIG. 3, two isotopes of neon having overlapping spectra are shown subjected to a laser field. The upper trace of the graph to the right effectively represents the Doppler-broadened line when the field is off. The lower trace represents the resolved lines when the atoms are subjected to a laser field. The laser is tuned to the exact wave length of the $2s_2$–$2p_4$ transition in Ne$^{22}$. When the laser is "turned on," a stationary wave is produced which may be decomposed into oppositely propagating traveling waves of the same frequency. The radiation along the longitudinal axis of the laser from the on-resonance Ne$^{22}$ atoms produces a strong single trace. At the same time, the off-resonance atoms of Ne$^{20}$ having velocities at some fixed angle with respect to the longitudinal axis will be selected and produce the narrowed and shifted double trace. From these traces, a direct measurement of the isotopic shift can be made. It will be appreciated that from these direct measurements, isotope shifts at other transitions can be derived. As an example, since it is possible to measure the isotope shift between the Ne$^{22}$ and Ne$^{20}$ at 6096 A., it is possible to derive the isotope shift for Ne$^{22}$ and Ne$^{20}$ at $1.15\mu$. Twice the Doppler shift at 6096 A. is given by (2) $$2W'_0 \frac{V}{c} = S$$

the frequency separation of Ne$^{20}$ peaks where $W_0'$ = center of the 6096 line for Ne$^{20}$.

Given that (3) $$V \approx \frac{c}{W_0}\left(W - W_0\right)$$

where $W_0$ = the center of the Ne$^{20}$ peak at $1.15\mu$ and
$W$ = a frequency removed from $W_0$ then (4) $V \approx c/W_0$ (isotope shift at $1.15\mu$)

From Equations 2 and 4

(5) $$S = 2W'_0 \frac{V}{c} = 2\frac{W'_0}{C}\frac{c}{W_0}$$

(isotope shift at $1.15\mu$)

Simplifying Equation 5, we obtain (6) $$S\frac{W_0}{2W'_0} = \text{(isotope shift at } 1.15\mu)$$

Since we can measure S, and since $W_0'$ and $W_0$ are well known, the isotope shift at $1.15\mu$ can be derived.

In addition to narrowing the spectral lines, the shape of the trace conveniently indicates to which of the two isotopes the laser is tuned. Thus, by tuning and detuning the laser to obtain a "three peak" pattern, the precise operating frequency of the laser may be obtained and maintained by suitable feedback circuitry (not shown).

It will be appreciated that this velocity dependent effect will not be observed transverse to the longitudinal axis of the laser for the laser tuned to its center frequency.

It will further be appreciated that if $\lambda$ of the laser is set between $\lambda_{22}$ and $\lambda_{20}$ the pattern exhibits four peaks.

Obviously many modifications and variations of the present invention are possible in the light of the above teachings. It is therefore to be understood that within the scope of the appended claims the invention may be practiced otherwise than as specifically described.

What is claimed is:

1. Apparatus for separating overlapping spectra of first and second isotopes of the same element so as to permit direct measurement of the difference in wavelength between the adjacent spectra of these isotopes, comprising:

means for subjecting said first and second isotopes to the stationary and traveling waves occurring within the active region of a laser which is tuned to a predetermined transition of said first isotope so that the spectral line widths of the stimulated emissions from said first and second isotopes at lower transitions are narrowed by selecting for said spectra only contributions from atoms traveling along the longitudinal axis of said laser and atoms traveling in two different directions symmetrically disposed on either side of this axis;

means for forming an interference pattern from the stimulated radiation which is emitted by said laser along the longtiudinal axis thereof so that a three-peak interference patterns is formed with a single maxima corresponding to a spectral line of the isotope to which said laser is tuned and with a minima surrounded by two maxima, said minima corresponding to a spectral line of the isotope to which said laser is not tuned; and means for ascertaining the wavelength of the maxima corresponding to the stimulated emission from said first isotope and the minima corresponding to the stimulated emission of said second isotope, the difference in wavelengths of said maxima and minima corresponding to the displacement of spectral lines of said isotopes due to isotope shift, whereby the direct measurement of said shift is made possible by the line narrowing caused by said tuning.

References Cited

UNITED STATES PATENTS 3,411,849  11/1968  Aronowitz _____ 356—106

OTHER REFERENCES

"Rapid Scanning of Spectral Line Profiles Using an Oscillating Fabry-Perot Interometer"; Cooper & Greig; J. Sci. Instrum; vol. 40; 1963; September; pp. 433–437.

RONALD L. WIBERT, Primary Examiner

V. P. McGRAW, Assistant Examiner

U.S. Cl. X.R.

331—94.5